Dec. 11, 1973 J. A. McINTOSH Re. 27,837

PLASTIC SAFETY CLOSURE

Original Filed Dec. 30, 1962

INVENTOR,
JAMES A. Mc INTOSH
BY
McLean, Morton and Boustead
ATTORNEYS

United States Patent Office

Re. 27,837
Reissued Dec. 11, 1973

27,837
PLASTIC SAFETY CLOSURE

James A. McIntosh, Upper Montclair, N.J., assignor to Mack-Wayne Plastics Co., Wayne, N.J.

Original No. 3,520,435, dated July 14, 1970, Ser. No. 787,695, Dec. 30, 1968. Application for reissue Feb. 9, 1972, Ser. No. 224,999
Int. Cl. B65d *21/00*
U.S. Cl. 215—9 4 Claims

Matter enclosed in heavy brackets [ ] appears in the original patent but forms no part of this reissue specification; matter printed in italics indicates the additions made by reissue.

ABSTRACT OF THE DISCLOSURE

A plastic safety closure for threaded neck containers is described having an inner cap and an encompassing outer cap, each cap having engaging means, the engageing means being engaged for simultaneous rotation of the caps when the cap tops are in juxtaposition, and a plug associated with the outer cap capable of extending through the top of the outer cap to contact the top of the inner cap, thereby to maintain the cap tops separated and the engaging means in non-engaging relationship.

This invention relates to an improvement in plastic safety closures for containers having threaded necks. More particularly, this invention provides an improved safety closure which in fixed closed position has a freely rotatable outer cap but which closure upon manipulation causes the outer cap to engage with an inner cap to remove the closure.

In the modern household, there are many products in daily use which can be harmful or dangerous when taken internally. These products include household detergents, pesticides, pharmaceutical preparations, solvents, and the like. Although hazardous substances are required to bear warning labels, these products are a continual source of danger to small children. Recently interest has been focussed on this problem by committees formed with representatives from government, industry and the professions to develop and promulgate standards for safety closures. The plastic safety closure of this invention is directed to providing a child-proof cap for use with hazardous products ordinarly marketed in threaded neck containers. The plastic safety cap of this invention is simple in construction and inexpensive to manufacture.

The plastic safety closure of this invention provides a closure for use on a threaded neck container having a threaded outer wall, an inner wall and an interconnecting rim. The closure member itself is composed of two separate parts, i.e. an inner cap and an outer cap, the inner cap being telescoped within the encompassing outer cap.

The inner cap includes a top wall, a tapped cylindrical skirt depending from the top wall for threaded engagement with the outer wall of the threaded neck container, and at least one engaging means positioned substantially vertically near the outside lower edge of the cylindrical skirt.

The outer cap includes a top wall, the top wall having a substantially centrally positioned opening therein, a cylindrical skirt depending from the top wall of sufficient inside diameter to encompass the inner cap, at least one engaging means positioned substantially vertically near the inside upper edge of the cylindrical skirt, and an annular bead positioned near the inside lower edge of the cylindrical skirt.

The outer cap is integrally molded with a crown and a relatively thin hinge connects the crown to the outer cap near the periphery of the outer cap. The crown has a substantially centrally positioned plug depending therefrom, adapted slidably to engage, close and extend through the substantially centrally positioned opening in the top wall of the outer cap, together with flexible means associated with the plug to maintain the crown and the outer cap in fixed closed position.

The plug is dimensioned longitudinally to contact the top wall of the inner cap when in fixed position to maintain the respective engaging means of the inner and outer caps in non-engaging relationship, and the annular bead on the inside lower edge of the outer cap cylindrical skirt is positioned to contact the bottom surface of the inner cap cylindrical skirt when the plug is in fixed position. Thus when the plug is in fixed position, the outer cap rotates freely with respect to the inner cap and the container is closed.

When the crown is raised, however, removing the plug, the outer cap descends toward the inner cap, the engaging means of the inner and outer caps engage, and the inner and outer caps rotate together so that the container can be opened or closed.

A preferred embodiment of the plastic safety cap of my invention is shown in the accompanying drawings wherein.

Figure 2:
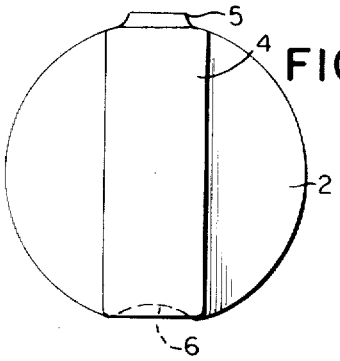
FIG. 2 is a plan view of the outer cap of FIG. 1 showing the hinged crown and the fingerhold.

Referring now to the drawings, the plastic safety closure consists of an outer cap generally designated as 1 and an inner cap generally designated as 8.

Figure 1:
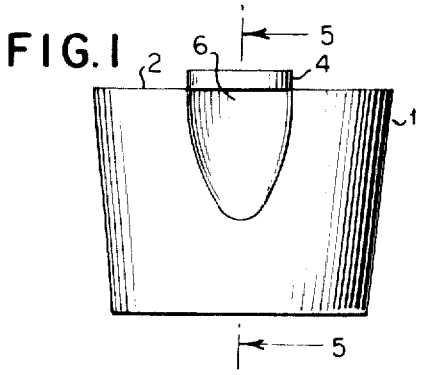
FIG. 1 is a side view of the outer cap showing the relatively thin hinged crown, in closed position, the main body of the outer cap, and an indentation in the outer surface of the outer cap positioned under the free end of the crown as a fingerhold.
Figure 7:
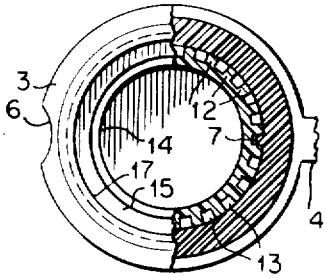
FIG. 7 is a cross-sectional view along line 7—7 of FIG. 1.

FIGS. 1, 2 and 7 show outer cap 1 composed of top wall 2 and skirt 3 depending therefrom. Outer cap 1 has integrally molded therewith crown 4, attached to outer cap 1 by hinge 5, fingerhold indentation 6 and lugs 7 on the inner surface of skirt 3.

Figure 4:
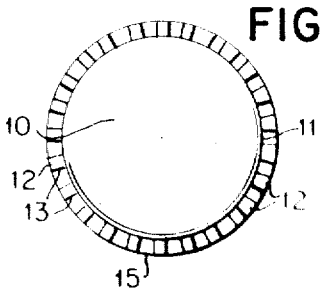
FIG. 4 is a plan view of the inner cap.
Figure 3:
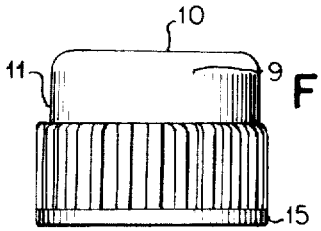
FIG. 3 is a side view of the inner cap showing an embodiment of the engaging means on the outer surface of the inner cap.

FIGS. 3 and 4 show inner cap 9 composed of top wall 10 and skirt 11 depending therefrom. Inner cap 9 has integrally molded therewith lugs 12 forming grooves 13 on the outer surface of skirt 11. Also, inner cap 9 has an annular bead 15 at the base of its outside surface, bead 15 having a diameter such that its periphery is approximately coextensive with the outer surface of lugs 11.

Figure 6:
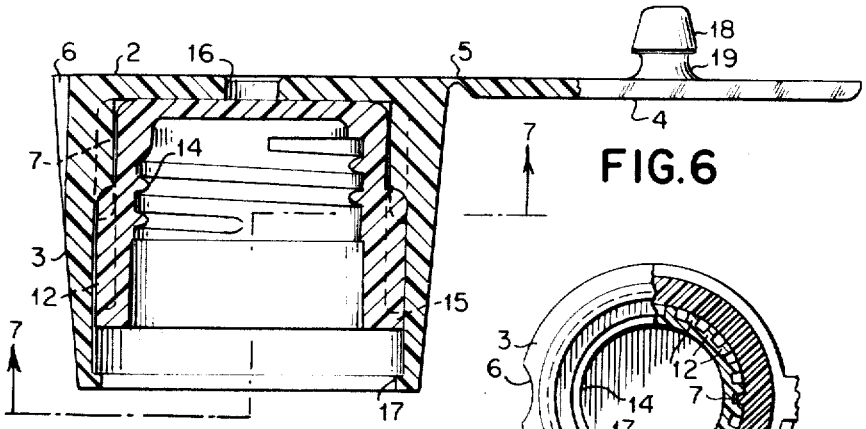
FIG. 6 is a cross-sectional view similar to FIG. 5 but showing both the inner and the outer cap with the plug removed from the outer cap opening and engagement of the inner and outer cap engaging means.
Figure 5:
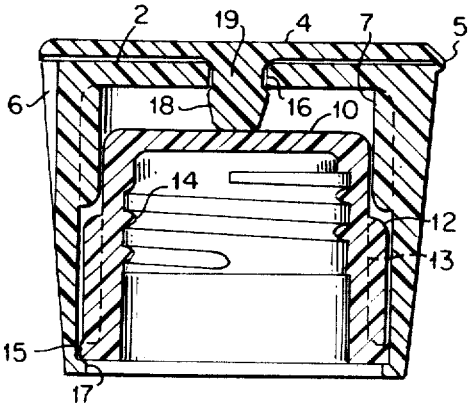
FIG. 5 is a cross-sectional view showing both the inner and outer cap with the plug in fixed position in the outer cap opening preventing engagement of the inner and outer cap engaging means.

FIGS. 5 and 6 show inner cap 9 encompassed by outer cap 1 and details of both caps. For example, these figures show that the cylindrical skirt 11 of inner cap 9 is tapped to provide threads 14 which mate with the threads on the threaded neck container (not shown).

These figures further show that outer cap 1 has an opening 16 in top wall 2, and an annular bead 17 at the base of its inside surface. Also, crown 4 has plug 18 integrally molded therewith. Plug 18 has a neck 19 of reduced cross-section such that its diameter approximates that of opening 16.

The operation of the plastic safety cap of this invention is shown with reference to FIGS. 5 and 6. FIG. 5 shows the safety cap in closed position with plug 18 extending through opening 16, plug 18 being held in place by bearing of the rim of opening 16 on the under surface of the head of plug 13, plug 18 contacting top wall 10 of inner cap 9, and annular bead 15 of inner cap 9 contacting annular bead 17 of outer cap 1. In this closed position, it can be seen that lugs 7 and 12 on outer cap 1 and inner cap 9 respectively are vertically seperated such that outer cap 1 is freely rotatable with respect to inner cap 9, and inner cap 9 remains threadedly engaged in closed relationship with the threaded neck container.

FIG. 6 shows the safety cap in open position with plug 18 removed and outer cap 1 in lowered position with respect to inner cap 9 such that lugs 7 mate with grooves 13 and rotation of outer cap 1 will cause rotation of inner cap 9 and removal of the safety cap from the threaded neck container.

As will be apparent to one skilled in the art, the inner cap of the safety closure of this invention can be constructed of any material normally employed in the manufacture of bottle caps, i.e. any of the common metals, or a semi-rigid plastic such as Bakelite or polystyrene. The outer cap, however, should be formed from any of the well known resilient plastic materials such as polyethylene or polypropylene. Preferably the entire closure, including the inner and outer caps, is molded as separate units employing a semi-flexible, semi-rigid plastic such as polypropylene.

Where the threaded neck container is used to store moisture sensitive dry products or where tight sealing is necessary during storage of liquid products, advantageously the inner cap incorporates the features of the cap described and claimed in U.S. Letters Patent No. 3,286,866. Where such products are volatile, advantageously the inner cap incorporates the features of the cap described and claimed in U.S. Letters Patent No. 3,398,818.

I claim:

1. A [plastic] safety closure for use on a container having [a threaded] *an* outer wall, an inner wall and an interconnecting rim, *said outer wall having a configuration which permits release of a cooperating closure upon relative rotation of the closure and container*, said closure comprising an inner cap and an outer cap, the inner cap being telescoped within the [encompassing] outer cap;

(a) the inner cap including a top wall, a [tapped] cylindrical skirt depending from the top wall [for threaded engagement with the outer wall of the threaded neck container] *thereof, said skirt having means positioned to engage said configuration and being releasable therefrom upon relative rotation of said inner cap and container*, at least one engaging means positioned [substantially vertically near the outside lower edge of the cylindrical skirt] *on the outer surface of said inner cap for cooperation with said outer cap;*

(b) the outer cap including a top wall, the top wall having [a substantially centrally positioned opening therein] *an opening positioned therein aligned with the top wall of the inner cap*, a cylindrical skirt depending from the top *of the outer cap* of sufficient diameter to encompass the inner cap, at least one engaging means positioned [substantially vertically near the inside upper edge of the cylindrical skirt] *on an inner surface of said outer cap*, and [an annular bead] *means* positioned near the inside lower edge of the cylindrical skirt *for inhibiting separation of said inner and outer caps*, the outer cap being integrally molded with a crown;

(c) the crown having a [centrally positioned] plug depending therefrom adapted [slidably] to engage, close and extend through the [substantially centrally positioned] opening in the top wall of the outer cap, and a relatively thin hinge connecting the crown to the outer cap near the periphery of the outer cap, [flexible means associated with the plug to maintain the crown and outer cap in fixed closed position] *the crown including means for releasably holding the plug in a fixed closed position extending through the opening;*

(d) the plug being dimensioned [longitudinally] to contact the top wall of the inner cap when in *said* fixed closed position to maintain the respective engaging means of the inner and outer caps in non-engaging relationship, and the [annular bead on the inside lower edge of] *inhibiting means on* the outer cap cylindrical skirt being positioned to contact the bottom surface of the inner cap cylindrical skirt when the plug is in *said* fixed position, thereby permitting free rotation of the outer cap with respect to the inner cap but such that when the crown is raised, removing the plug *from the opening*, the outer cap [descends] *can descend* toward the inner cap, *permitting* the engaging means of the inner and outer caps *to* engage, [and] *so that* the inner and outer caps [rotate together] *are not freely rotatable with respect to each other.*

*2. In a safety closure for a container of the type having a cylindrical neck over which a closure is adapted to fit, the closure being of the type having an inner cylindrical cap which is securable over the neck of the container bya rotary motion, and an outer cap surrounding the inner cap for selectively inhibiting rotation of the inner cap; the improvement wherein said inner cap includes a top wall having a cylindrical skirt extending therefrom, said outer cap including a top wall and a cylindrical skirt extending therefrom, the cylindrical skirt of the outer cap surrounding the cylindrical skirt of the inner cap, an aperture in the top wall of the outer cap and aligned with the top wall of the inner cap, a crown on the outer cap and hinged thereto near the periphery of the outer cap, said crown having a projection extending therefrom whereby said crown may be rotated about its hinge to a first position with the projection extending through said aperture and engaging the top wall of the inner cap, and to a second position withdrawn from said aperture, means for releasably holding said crown in a fixed position with respect to said outer cap in said first position, said projection extending from said crown a sufficient distance whereby in said first position of said crown the top walls of said inner caps are spaced a given distance apart and the top wall of the outer cap may be moved closer to the top wall of the inner cap in the second position of said crown, the inner surface of the outer cap and the outer surface of the inner cap having engaging means positioned thereon whereby the engaging means are inactive in the first position of said crown to permit free rotation of the outer cap with respect to the inner cap, and the engaging means are engaged upon said movement of the top wall of the outer cap to a closer position to the top wall of the inner cap when said crown is moved to its second position, whereby the inner cap may be rotated by rotation of the outer cap, the cylindrical skirt of the outer cap having means cooperating with the cylindrical skirt of the inner cap for inhibiting separation of the top walls of the inner and outer caps a distance substantially greater than said given distance.*

*3. The safety closure of claim 2 wherein said outer cap is formed of a resilient plastic material, the hinge between the outer cap and crown being integrally molded with the crown and outer cap, and wherein said means for releasably holding said crown comprises an enlarged portion of said projection positioned to engage the sides of said opening.*

*4. The safety enclosure of claim 2 wherein said engaging means comprises lugs formed on the outer surface of said cylindrical skirt of said inner cap, and lugs formed on the inner surface of the cylindrical skirt of the outer cap, said lugs on the inner and outer caps being engageable only when said crown is moved to said second position and said outer cap is moved to said closer position to said inner cap.*

References Cited

The following references, cited by the Examiner, are of record in the patented file of this patent or the original patent.

UNITED STATES PATENTS

| | | | |
|---|---|---|---|
| 3,160,301 | 12/1964 | Milbourne | 215—9 |
| 3,485,402 | 12/1969 | Tunstall | 215—9 |
| 3,556,331 | 1/1971 | Towns | 215—9 |
| 3,396,864 | 8/1968 | Jones et al. | 215—9 |
| 3,422,978 | 1/1969 | Quackenbush | 215—9 |

GEORGE T. HALL, Primary Examiner